United States Patent [19]

Gouda

[11] Patent Number: 5,695,226
[45] Date of Patent: Dec. 9, 1997

[54] CONDUIT COUPLING

[76] Inventor: Osamu Gouda, 628-8, Noborito, Tama-ku, Kawasaki-shi, Kanagawa-ken, Japan

[21] Appl. No.: 730,706

[22] Filed: Oct. 11, 1996

Related U.S. Application Data

[63] Continuation of Ser. No. 384,036, Feb. 6, 1995, abandoned.

[30] Foreign Application Priority Data

Feb. 8, 1994 [JP] Japan .................................. 6-035362

[51] Int. Cl.$^6$ .................................................. F16L 19/08
[52] U.S. Cl. .................................. 285/340; 285/379
[58] Field of Search ......................... 285/340, 902, 285/86, 179, 156, 354, 379

[56] References Cited

U.S. PATENT DOCUMENTS

| | | | |
|---|---|---|---|
| 2,147,353 | 2/1939 | Scholtes | 285/340 |
| 2,444,380 | 6/1948 | Shimek | 285/340 |
| 3,365,219 | 1/1968 | Nicolaus | 285/340 |
| 3,545,794 | 12/1970 | Wise | 285/340 |
| 3,580,617 | 5/1971 | Ehrenberg | 285/340 |
| 3,591,205 | 7/1971 | Hamburg | 285/340 |
| 3,679,241 | 7/1972 | Hoffmann | 285/340 |
| 3,697,102 | 10/1972 | Falke | 285/340 |
| 4,084,843 | 4/1978 | Gassert | 285/340 |
| 4,258,943 | 3/1981 | Vogt et al. | 285/340 |
| 4,500,117 | 2/1985 | Ayers et al. | 285/86 |
| 4,773,680 | 9/1988 | Krumme | 285/340 |
| 4,895,395 | 1/1990 | Ceriani | 285/340 |

FOREIGN PATENT DOCUMENTS

| | | | |
|---|---|---|---|
| 557701 | 5/1958 | Canada | 285/340 |
| 84672 | 2/1965 | France | 281/340 |
| 246605 | 6/1987 | Germany | 285/340 |
| 163588 | 6/1990 | Japan | 285/340 |
| 1018227 | 1/1966 | United Kingdom | 285/340 |
| 1195723 | 6/1970 | United Kingdom | 285/340 |
| 2172071 | 9/1986 | United Kingdom | 285/340 |
| 2234306 | 1/1991 | United Kingdom | 285/340 |

*Primary Examiner*—Eric K. Nicholson
*Attorney, Agent, or Firm*—Raymond J. Lillie

[57] ABSTRACT

A locking washer 54a formed in a conical shape and a seal retainer 56a are disposed between a coupling member 30 and the internally directed flange 50 of a fastening nut 36a. These locking washer 54a and seal retainer 56a are placed so that an outer periphery thereof is positioned on the side of said coupling member, while an internal periphery thereof positioned on the internal surface of said fastening nut, when no external force is applied on said locking washer. When the fastening nut 36a is screwed to be tightened on said coupling member, the internal periphery of the locking washer 54a having recesses is reduced with its diameter, and the locking washer 54a together with the locking washer 54a urge the tubular conduit 38a into the coupling member 30 and grippingly deformably retain the conduit as indicated by the locking washer 54b. The conduit coupling of the invention is effectively applicable for any conduit formed of rigid metal or flexible plastic material.

5 Claims, 6 Drawing Sheets

CONDUIT COUPLING

This application is a continuation of U.S. patent application Ser. No. 08/384,036, filed Feb. 6, 1995, now abandoned.

BACKGROUND OF THE INVENTION

1. Field of the Invention

The present invention relates to a conduit coupling for liquid or gas to flow, and more particularly to that comprising a coupling member and a fastening nut.

2. Brief Description of the Prior Art

Various conduit couplings ape designed to prevent retraction of conduit and leak of fluid out of joint position, and which are appropriately selected in view of the use or property of fluid flowing within the conduit. For instance, in a water supply conduit of a small diameter, a male thread formed on the end of the conduit by means of a die is adapted to mesh with a female thread formed on a joint member. In the case of a conduit of a large diameter or a conduit fop flowing a pressurized liquid, a flange is provided on each of the conduits to be coupled, and each flange is joined through a packing by means of bolts. Further, in one case of a metal conduit, in order to prevent retraction of conduits, the end of the conduit is widened as the form of a trumpet, which is together with a coupling member fixed by fastening nuts; or in another case, a semi-circular projections, formed radially adjacent the end of the conduit by use of a conduit enlarger, are joined to a inwardly formed flange of the fastening nuts to prevent retraction of the conduit.

In another coupling in use for connecting deformable conduits such as of a small sized plastic or rubber, a member having a slightly larger diameter (sleeve-shaped insert) than the inner diameter of the conduit provided on a coupling member is inserted on the end of the conduit, to prevent difficulty of connection by deformed conduit and also prevent leak of fluid flowing within the conduit. In a further coupling, an insert received in a conduit and a sleeve provided externally on the conduit are used in combination, and a tapered end projection formed on the external sleeve is gripped into the outer surface of the conduit, when the coupling member and fastening nut are meshed together, to prevent leak from the joint position of the conduit, and also to prevent retraction of the conduit. In addition, the laid-open utility model publication No. 61-181184 (1986) discloses a sleeve of a conical spring provided between a coupling member and fastening nut, the inner periphery of which sleeve is gripped into the outer surface of the conduit, to improve the anti-retraction strength of the conduit.

As shown in FIG. 6(a) of the prior art above, after a fastening nut 12 is inserted into the end of conduit 10, a conical sleeve 14 is fitted with its inner periphery engaged joint member 16, and when the fastening nut 12 is screwed into joint member 16, the sleeve 14 is made flat as shown in FIG. 6(b), where the inner periphery 18 of sleeve 14 is inclined relative to the axis, and the inner diameter is reduced to engage deformably on the conduit 10 to prevent retraction of the conduit 10 from joint member 16.

However, the afore-mentioned prior art has the following disadvantages.

The coupling construction of the conduit to which a joint flange is to be attached requires a difficult process, such as a process of welding a flange on the conduit, and also requires that of cutting the conduit as necessary, thereafter joining the conduit. Each of methods including providing a screw thread, broadening the end of the conduit, or forming a semi-circular projections on the end of the conduit requires the additional process of machining, and each is not applicable for the easily deformable conduit formed of a non-rigid material. Especially, in the method including conduit end broadening process, it is difficult to make uniform of the broadened figure, which requires an additional process for forming the broadened end.

Also, that including a process of inserting a small diametrical insert into the conduit end is applicable neither for a conduit of a hard rigid metal material, nor for a highly pressurized fluid, and anti-retraction strength is also not satisfactory. Because of inserting a member having a slightly larger internal diameter than that of the conduit, the internal diameter is further reduced at the inserted position, to produce a stepped area within the fluid passage, fluidity therein is decreased to produce a fluid accumulation, therefore not applicable for a decompositive liquid or liquid for which cleanness is required. Also, in that using a sleeve member, it is difficult to attain an increased anti-retraction strength, and likely to cause liquid leak due to vibration.

In this connection, the laid-open utility model publication No. 61-181184 (1986) discloses a conduit coupling, in which the internal periphery of a disk-like sleeve is gripped around the outer surface of the conduit for providing a comparatively greater anti-retraction strength. However, since the sleeve 14 is located so that the outer side thereof is directed toward the internally directed flange 17, the conduit 10 is let retracted from the joint member 16 as the arrow indication 22 when the fastening nut 12 is let flat by being tightened. This causes a gap 26 between the stopper 24 of joint member 16 and the end of conduit 10 for producing a liquid accumulation therein. Further, the separation of the end surface of conduit 10 from the stopper 24, prevents the role of mechanical seal, and supporting ability of the end portion of the conduit 10 becomes insufficient. Also, by the coupling construction, the conduit 10 is not easily withdrawn from joint member 16, since the sleeve 14 is oppositely inclined relative to the withdrawn direction of conduit 10.

SUMMARY OF THE INVENTION

An object of the present invention is to provide a conduit coupling in which any conduit formed of a rigid metal or non-rigid plastic material can be easily joined to each other.

Another object of the present invention is to provide a conduit coupling which is improved in higher anti-retraction strength at the coupling position of conduits.

A further object of the present invention is to provide a conduit coupling in which liquid accumulation is prevented.

The invention has been made on the basis of a variety of experiences and reviews by the inventor over several years, and also based on a new conception extremely advanced and different from the conception which was known as a common knowledge in the past, that, "originally the use of a conical spring member for the conduit coupling is effective only in the limited case thereof, where the conduit is to be inserted especially from the enlarged diameter end thereof", as is disclosed in the laid-open Utility Model Publication No. 61-181184. To achieve the afore-mentioned objects of the invention, the conduit coupling comprises: a coupling member having an entry bore and an external male thread; a fastening nut having a flanged portion with a central opening and a female thread to mesh with the thread of coupling member; and a locking washer formed as a conical spring washer having a central opening whose dimension can be reduced when axially compressed, the opening having a plurality of recesses to form a plurality of tabs; the locking washer being placed so that an outer periphery thereof is positioned on the side of the coupling member, while an internal periphery thereof positioned on the internal surface of the fastening nut, when no external force is applied on the locking washer; and locking washer being applied with an axial force, when screwed on the coupling member, and having the central opening reduced with its dimension to lock firmly the conduit and secure the conduit to the coupling member.

The locking washer is preferably formed of a resilient material. At the entry bore of coupling member, a seal recess for a seal member such as an O-ring may be provided. Further preferably, a seal retainer of a conical spring, provided between the coupling member and the locking washer, is disposed so that the outer and internal peripheries thereof are directed toward the coupling member and the locking washer, respectively. In addition, an internal stopper portion may be formed within the coupling member for receiving the end of the inserted conduit. Also, the entry bore of the coupling member may be formed so that the end of the stopper is reduced in diameter as approached to the stopper portion.

When fastening nut is tightened with the coupling member, locking washer, interposed between coupling member and fastening nut, and compressed in the axial direction, the diameter of the internal opening of the washer gradually decreases. As a result, the washer is firmly engaged with the external surface of the conduit. After the conduit is secured to the coupling member, rather a greater force is necessary to separate both members from each other, and a higher amount of anti-retraction strength is obtained. Further, for this purpose, a particular machining or the like is not required on the end area of the conduit to provide a simplified connection. The locking washer, although deformably engages around the conduit, would not deform it in excess over the extent necessary to retain the rigid metal conduit, and the same manner is also applicable for retaining a conduit of a non-rigid material such as of plastic or rubber. Also, as the locking washer, when no external force is applied thereon, is positioned so that the outer periphery thereof is directed toward the coupling member, while the internal periphery is directed toward the fastening nut. Therefore, upon release of the fastening nut, the fastening nut is returned to the condition inclined toward the withdrawing direction, thereby making ease of withdrawal of the conduit out of the coupling member and of maintenance and inspection.

The locking washer and seal retainer, formed of a resilient material and fastened by the fastening nut, apply an axial force on the coupling member and fastening nut, to prevent looseness therebetween. Especially, by forming the coupling member and fastening nut with stainless steel or the like and the locking washer and seal retainer with an anti-corrosive spring material, it is possible to obtain a conduit coupling durable over fully 30 years.

The object of providing a seal retainer in addition to the fastening washer is to prevent completely fluid leak due to pressure or also to vibration by the same conception of providing an O-ring packing between flanges which are tightened to a predetermined extent by means of bolts. Such a seal retainer also serves to protect the seal member from being damaged by the edge of recess of the washer, and to prevent leak of even a highly pressurized fluid. A seal retainer formed as a conical spring is also disposed as its outer and internal peripheries are oriented in the condition same as that of the locking washer stated above. As the seal retainer acts to press the O-ring into the recess from the end surface of coupling member to prevent the O-ring from swelling out of the recess, the O-ring is protected from being damaged but is not pressed in excess than necessary, thereby neither durability nor seal ability of O-ring being lowered. Further, an axial force applied on coupling member, fastening nut and also on locking washer increases the effect of preventing looseness.

Further, a gap and also a fluid deposition which can be produced between the stopper and the end of tubular conduit is prevented, because the tubular conduit is forced to engage the face of the stopper portion, when the locking washer firmly grips the tubular conduit. The stopper or the reduced diameter portion formed within the passageway serves to strangle the end of the conduit to further increase sealing ability, and provide a rigid and stable conduit coupling by means of a three-point support formed of the reduced diameter portion, locking washer and fastening nut.

DETAILED DESCRIPTION OF THE PREFERRED EMBODIMENTS

Figure 1:
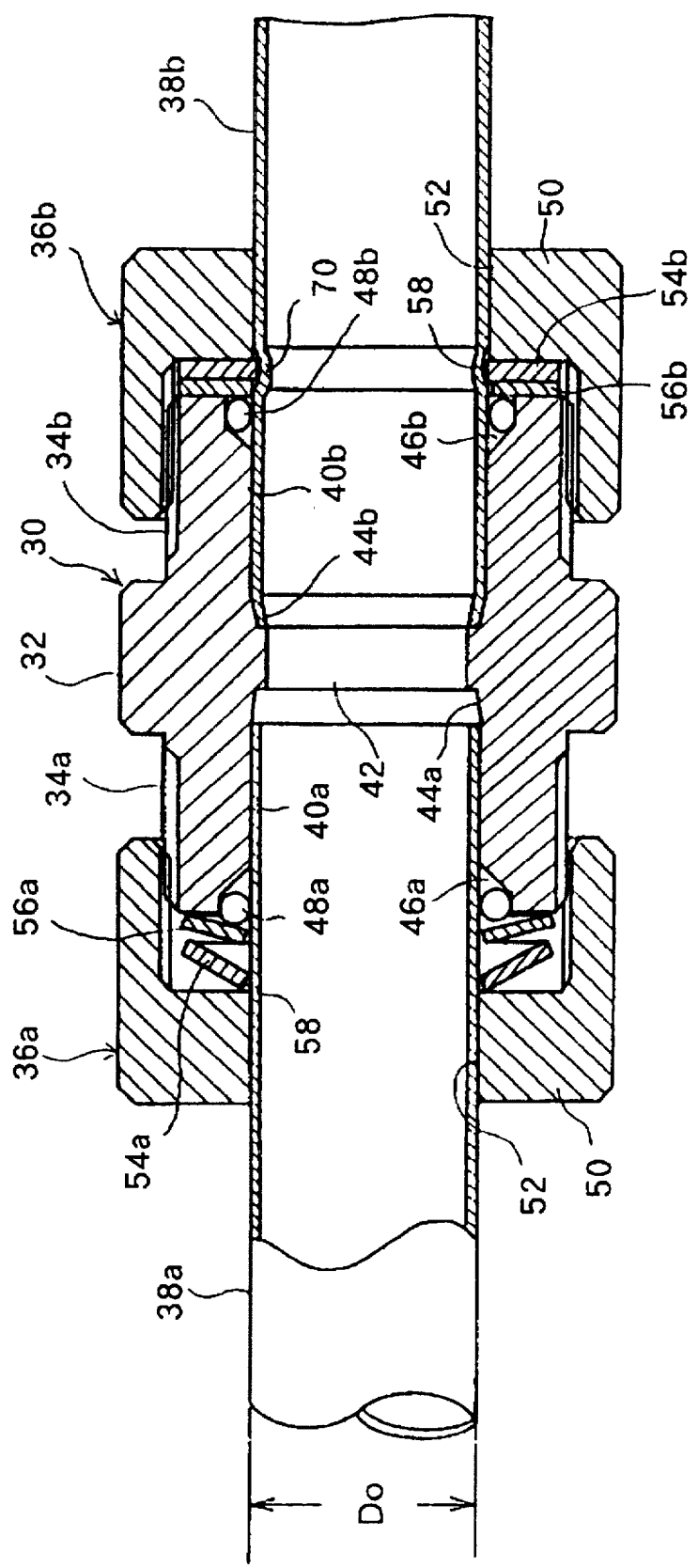
FIG. 1 is a sectional view of a conduit coupling according to the present invention: the left side shows a state before coupling and the right side shows that after being coupled.

In FIG. 1, each reference numeral with subscript "a" denotes a state of the member before coupling is completed, while the numeral with "b" denotes a state thereof after being coupled. In the description hereinafter, sometimes the numerals without subscript "a" or "b" are used for the general explanation.

Referring now to FIG. 1, a coupling member 30, having an enlarged diameter flange 32 centrally around the axis thereof, has its both ends threaded to form male threads 34a and 34b, respectively. The flanged portion 32 is shaped as hexagonal, which may be held by edges of a spanner to be tightened to mesh with the male thread 34a. The coupling member 30 has its both ends formed with axial bores 40a and 40b, respectively, for receiving each end of tubular conduits 28a and 38b. The bores 40a and 40b are in communication with each other through a slimmed portion 42 as a stopper having a reduced diameter. The bores 40a and 40b have each internal end thereof gradually reduced in its diameter to form each of tapered portions 44a and 44b, into which each end of the conduits is forced to engage with each end which is narrowed, when the coupling member 30 and fastening nuts 36a and 36b completely engage with each other. Each of axial bores 40a and 40b has its free end formed with an enlarged portion to be fitted by a seal member such as an O-ring 48a or 48b. Further, between the inner face of fastening nut 36a and the end surface of coupling member 30 is disposed a locking washer 54a and a seal retainer 56a. Also, there is shown another set of locking washer 54b and a seal retainer 56b, which are tightened between another end of the coupling member 30 and fastening nut 36b.

The locking washers 54a and 54b are made of a resilient material such as SUS304, each formed as a conical spring washer, formed with a central opening 58, and having a plurality of trapezoidal radial recesses along the inner periphery of the opening 58 so aopening 58 so as to form a plurality of separate spaced tabs 60 around the opening 58. The locking washers 54a and 54b are formed so that, when freed from an axial force, each has its internal diameter $D_1$ larger than the external diameter $D_0$ of tubular conduits 38a and 38b by the amount of 0.3 to 0.5 mm. The inclination angle "θ" between the conical surface and the bottom face is, although depending on the length of tabs 60, preferably in the amount of 20 to 30 degrees, and the washers 54a and 54b may be formed so that the central opening 58 is narrowed by 1 mm or more in its inner diameter $D_1$ and the tabs 60 are locked into the periphery of conduit 38 and firmly retained by the conduit 38a or 38b. For instance, when the conduit 38 is formed of a thin stainless steel and the external diameter $D_0$ is 15.9 mm, locking washers 54a and 54b are formed also of SUS304 having its inner diameter $D_1$ 16.2 mm, outer diameter $D_0$ 23.38 mm, and the angle "θ" 28°35'. In addition, coupling member 30 and fastening nuts 36a and 36b are formed of erosion resistant material such as stainless steel, seal retainer 56 is of SUS304, and O-ring 48 is of durable silicone rubber. Further, the fastening nuts 36a and 36b are formed with the diameter of its axial bores slightly larger, such as by 0.2 mm or so, than the outer diameter of conduits 38a and 38b for increasing effect of retaining the conduits 38 by means of fastening nuts 36a and 36b.

It is described how such a conduit coupling is completed as follows. First, a fastening nut 35 is fitted to a tubular conduit 38, and then a locking washer 54 and a seal retainer 56 are fitted. As shown in the left side of FIG. 1, the locking washer 54 and retainer 56 are positioned, when freed from an axial force, so that each inner fringe of both members rests on the inner bottom surface within the fastening nut 36, while the outer fringe thereof is oriented toward the end of tubular conduit 38. After placing an O-ring in a recess 46, the end of a tubular conduit 38 is inserted into a bore 40 of coupling member 30 until the end of tubular conduit 38 abuts against the front edge of tapered area 44 of the coupling member 30. Thereafter, the female thread of fastening nut 36 is meshed with the male thread 34 of coupling member 30, and fastening nut 36 is tightened, whereby locking washer 54 and seal retainer 56 are urged by an axial force by coupling member 30 and fastening nut 36, and the freed shape of locking washer 54a and seal retainer 56a are radially pressed and turned to the deformed shape shown as the washer 54b and retainer 56b as illustrated on the right side of FIG. 1.

Because the inner periphery of locking washer 54 engages the inner surface of the fastening nut 36, the internal periphery of locking washer 54a is reduced with its diameter to hold lockingly the tubular conduit 38 as the fastening nut 36 is gradually screwed, and the free end of tubular conduit 38a is narrowed and urged to enter the tapered portion 44a. In this process, the fastening nut 36 is locked to the tubular conduit 38, while the coupling member 30 is actually displaced relative to the conduit 38 and advances into the coupling member 30. Pressed by the internal periphery of locking washer 54, a reduced diameter portion 70 is formed around the tubular conduit 38, and the seal retainer 56, by radially urged, serves to produce the completed seal condition of the O-ring 48 which is completely confined within the recess 46a as shown by the numeral 48b.

Thus, the tubular conduit 38b is supported by the three-point suspension, comprising the tapered conduit portion 44b, locking washer 54b and fastening nut 36b, to achieve a rigid and stable connection of the conduit. Furthermore, the locking washer 54 together with seal retainer 56 provides an axial, accordingly thrust force on the coupling member 30 and fastening nut 36 to prevent these members from any looseness. Accordingly, by appropriately selecting the material of the members including coupling member 30, fastening nut 36, locking washer 54, seal retainer 56 and O-ring 48, even the requirement of exceeding fully 30 years durability as achieved by the piping of a thin stainless steel construction can be satisfied. Therefore, the conduit connection of the invention, even applied to the piping in the building subject to various external oscillations caused by an earthquake or the like, is in its function durable against various oscillations, and the seal ability is maintained for a long period of time. In addition, upon releasing the fastening nut 36, the locking washer 54 together with seal retainer 56 release the tubular conduit 38, thereby tubular conduit 38 growing to be easily removed from coupling member 30 as shown on the left side of FIG. 1.

As the seal retainer 56 acts to press the O-ring 48 into the recess 46 over the end surface of coupling member 30 to prevent the O-ring 48 from swelling out of the recess 46, the O-ring 46 is prevented from damage but is not pressed in excess than necessary, thereby neither durability nor seal ability of O-ring 48 being affected. Furthermore, a gap and also a fluid deposition therein which can be caused between the stopper 42 and the end of tubular conduit 38 is prevented, because the tubular conduit 38 is forced to engage the edge of the stopper portion 46, when the locking washer 54 firmly grips the tubular conduit 38. Also, because no special machining on the end of tubular conduit 38 is needed, both a conduit formed of rigid material, such as metal, and a flexible conduit such as formed of plastic or rubber can be easily joined. Further, the construction of locking washer 54 having its inner periphery formed as tapered and having a gradually increased diameter toward the entry side of tubular conduit 38 serves as the insertion guide for tubular conduit 38, and therefore, only by releasing the fastening nut 36, the tubular conduit 38 and coupling member 30 are easily joined to or removed from each other.

Figure 3:
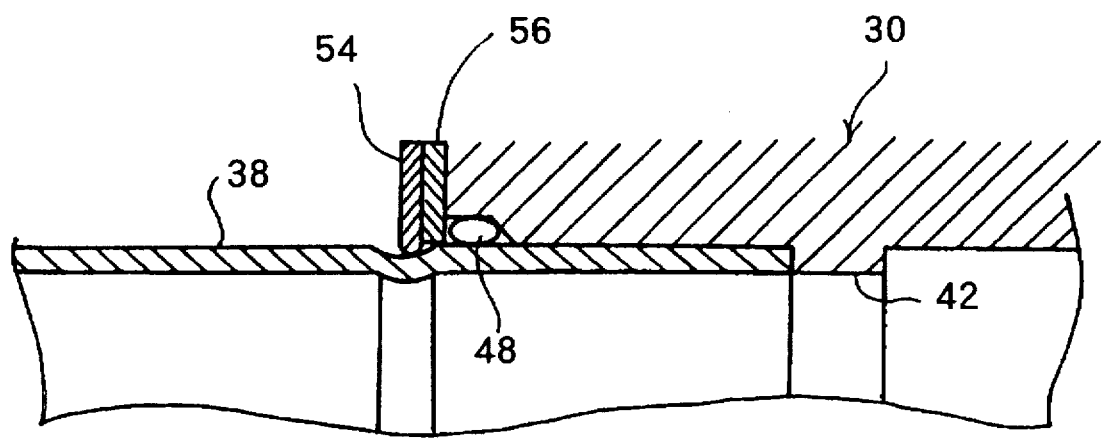
FIG. 3 is a sectional view of a locking washer according to another embodiment.
Figure 3:
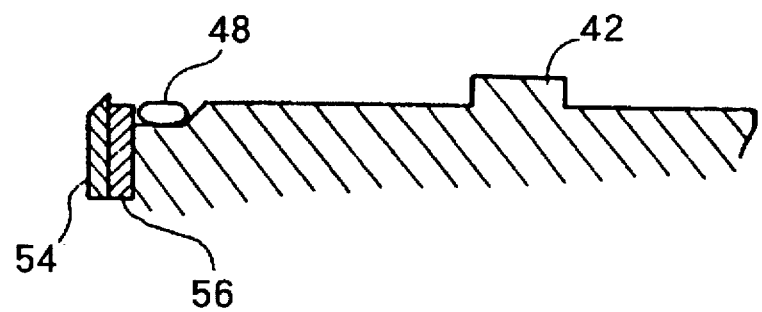
Figure 4:
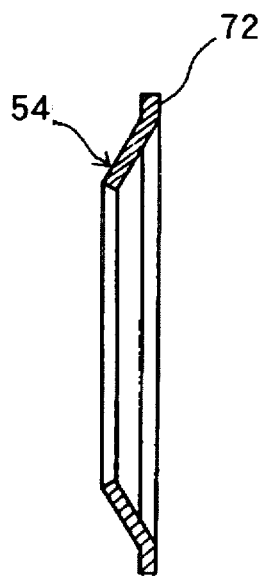
FIG. 4 is a sectional view of a locking washer of a further embodiment.
Figure 5:
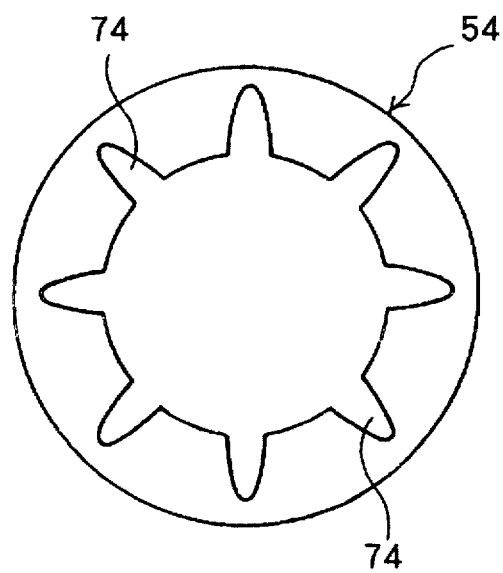
FIG. 5 is an illustrative view of recesses formed around the internal periphery of a locking washer.
Figure 6:
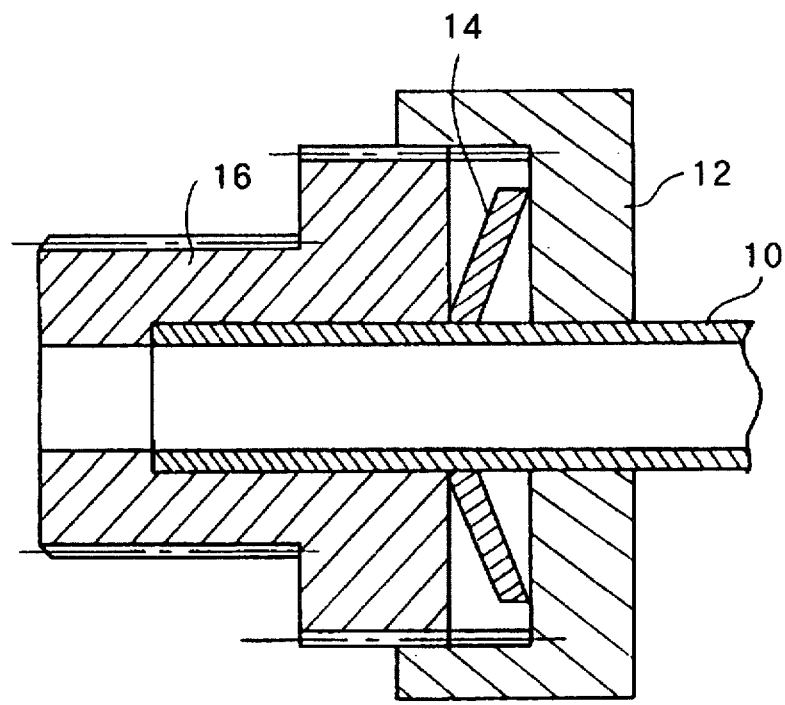
FIG. 6(a) and (b) each is a sectional view of a prior art conduit coupling.
Figure 6:
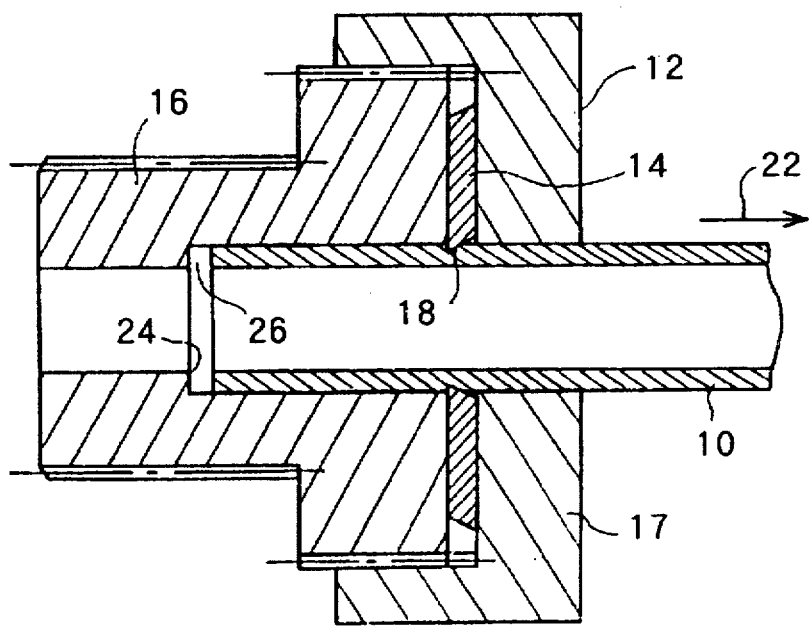

Among embodiments of a fastening nut 36 shown in FIGS. 3 to 5, an embodiment shown in FIG. 3(a) includes a locking washer 54 having its internal periphery formed in an arcuate shape in order not to scratch the tubular conduit 38 when gripped by locking washer 54. In addition, FIG. 3(b) shows another embodiment, in which the internal periphery of locking washer 54 is shaped as a wedge so that the fastening nut 36 becomes larger than the coupling member 30 in dimension, to facilitate gripping into tubular conduit 38, thereby increasing holding ability performed by locking washer 54. In the embodiment, the coupling member 30 has no provision which corresponds to the reduced diameter portion 44.

Figure 2:
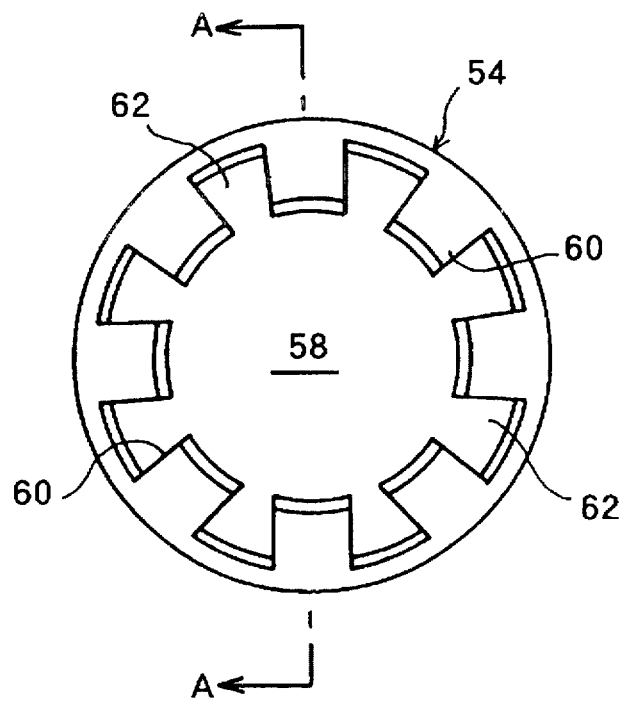
FIGS. 2a and 2b are a front view and a sectional view of a locking washer.
Figure 2:
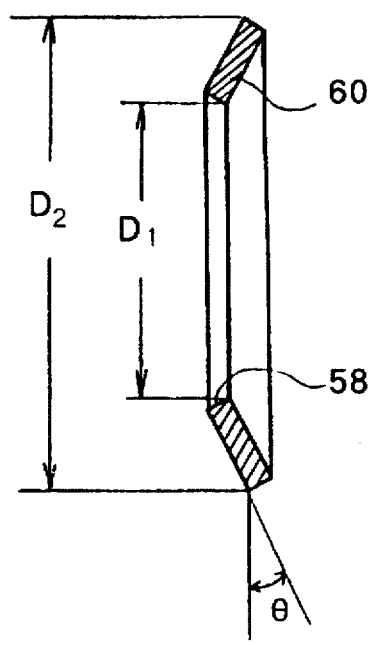

Another embodiment of a locking washer 54 shown in FIG. 4 have its outer periphery formed to have a flat flanged portion 72, and provides the same effect as stated above. Still another locking washer 54 shown in FIG. 5 is formed such that the width of the recess 74 is gradually reduced as approached to its outer end. The periphery of the recess 74 formed with a smoothed curve serves to prevent breakdown of the washer caused by a concentrated force applied thereon. Using a locking washer 54 of such a configuration, it is possible to apply a further increased axial force thereon than the case of FIG. 2, and more effective to prevent looseness caused in the conduit coupling. As the number of the recesses, one or more may be provided around the internal periphery.

Figure 7:
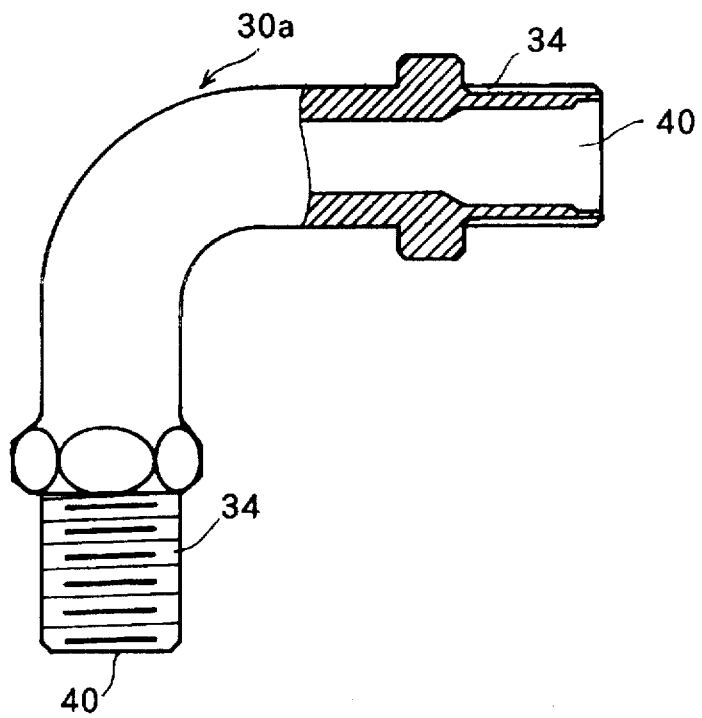
FIG. 7(a) is a front view of an L-shaped coupling member.
FIG. 7(b) is a front view of a T-shaped coupling member.
Figure 7:
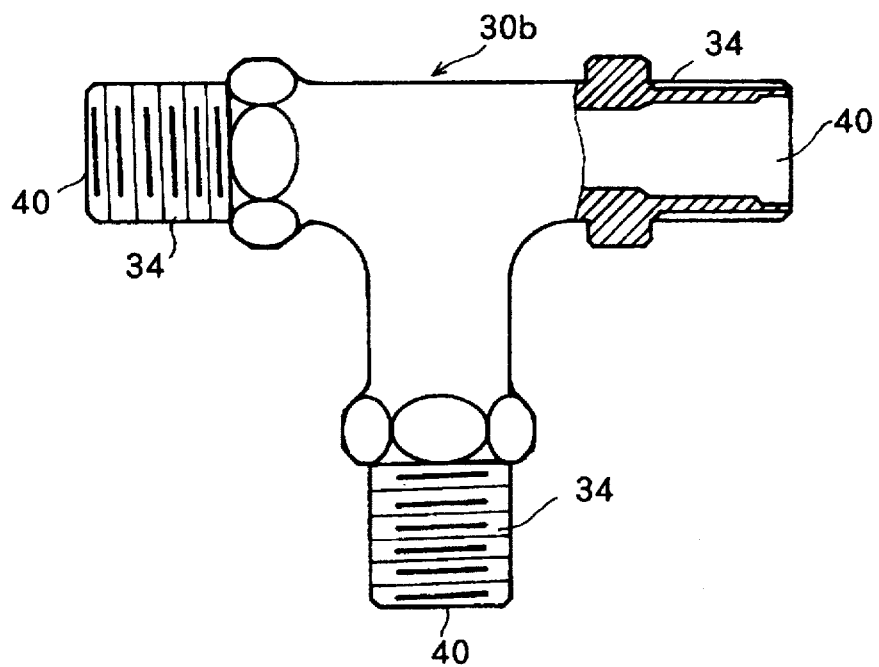

In the foregoing description, the embodiment of the I-shaped coupling member 30 has been described. Further, the invention can be embodied also as an L-shaped coupling member 30a and a T-shaped coupling member 36b shown in FIGS. 7(a) and 7(b), respectively.

In addition, at least one of the entry bore 40 of each of the coupling members 30, 30a and 30b may be provided with a male thread 34 for coupling a tubular conduit with an apparatus or instrument other than another conduit. Also, alternatively a female thread (not shown in the drawing) may be also provided at the entry bore 40 instead of the male thread 34.

Instead of stainless steel, any other materials, such as another metal or plastic material such as vinyl chloride, or rubber may be employed for the tubular conduit 38. Also, the invention can be applied for the conduit through which any liquid or gas is let flow. In addition, any of locking washer 54, seal retainer 56, coupling member 30, and fastening nut 36 may be also formed of a plastic material. Instead of formed in a conical spring washer, a type of the normal disk washer may be also employed as the seal retainer 56. Also, the seal retainer 56 may be omitted in some cases such as flowing a low pressure air.

As stated above, according to the invention, when fastening nut 36 is tightened with the coupling member 30, locking washer 54 interposed between coupling member 30 and fastening nut 36, and is compressed in the axial direction, the internal periphery is reduced in its dimension. As a result, the internal diameter of the washer 54 gradually decreases, and the washer is firmly engaged with the external surface of conduit 38. Accordingly, rather a greater force is necessary to withdraw the conduit 38 out of the coupling member 30, thus provides a great anti-retraction strength. In addition, no particular machining is necessary on the end portion of the conduit, providing a simplified construction of conduit coupling. According to the construction in which the conduit 38 is deformably gripped by the locking washer 54, the invention is applied for the conduit formed of not only a rigid metal, but also plastic or rubber. Also, the disassembly of the conduit coupling is simplified as follows. The locking washer 54, when no external force is applied thereon, is positioned so that the outer periphery thereof is oriented toward the coupling member 30, while the internal periphery is oriented toward the fastening nut 36. Therefore, upon release of the fastening nut 36, the fastening nut 36 is returned to the condition inclined toward the withdrawing direction, thereby making ease of withdrawal of the conduit out of the coupling member 30 and of maintenance and inspection.

The locking washer 54 and seal retainer 56, formed of a resilient material and fastened by the fastening nut, supply an axial force on the coupling member and fastening nut, to prevent looseness therebetween.

A seal receiving recess 46 is provided in the conduit entry side of the coupling member 30, in which a seal member such as an O-ring is disposed to prevent the seal member from being damaged by the edge of recess of the washer.

A seal retainer 56 formed as a conical spring is also disposed as its outer and internal peripheries are directed in the condition same as that of the locking washer 54 stated above.

Especially, the seal retainer 56 is formed of a conical spring. As the seal retainer 56 acts to press the O-ring 48 into the recess 46 from the end surface of coupling member 30 to prevent the O-ring 48 from swelling out of the recess 46, the O-ring 46 is prevented from damage but is not pressed in excess than necessary, thereby neither durability nor seal ability of O-ring 48 being lowered. Further, an axial force applied on coupling member 30, fastening nut 36 and also on locking washer 54 increases the effect of preventing looseness.

Furthermore, a gap and also a fluid deposition which can be produced between the stopper 42 and the end of tubular conduit 38 is prevented, because the tubular conduit 38 is forced to engage the face of the stopper portion 46, when the locking washer 54 firmly grips the tubular conduit 38. The stopper or the reduced diameter portion 42 formed within the passageway serves to strangle the end of the conduit 38 to increase further sealing ability, and provides a rigid and stable conduit coupling by means of a three-point support formed of the reduced diameter portion 42, locking washer 54 and fastening nut 36.

What is claimed is:

1. A conduit coupling for connecting conduits to each other, comprising:

a coupling member having an entry bore and an external male thread;

at least one fastening nut having a flanged portion, a central bore, an inner bottom surface, and a female thread to mesh with said external male thread of said coupling member;

at least one locking washer formed as a conical spring washer having a central opening whose dimension is reduced when compressed axially, said central opening having a plurality of recesses which form a plurality of tabs, said at least one locking washer being placed such that an outer periphery thereof is positioned toward said coupling member, and said at least one locking washer having an internal surface positioned toward said fastening nut when no external force is applied to said at least one locking washer, and said at least one locking washer being applied with an axial force when said fastening nut is screwed onto said coupling member, and whereby the size of said central opening of said at least one locking washer is reduced to lock firmly said conduit and secure said conduit to said coupling member;

at least one seal member, said at least one seal member having a diameter less than that of said coupling member;

at least one seal receiving recess formed on at least one of said at least one entry bore of said coupling member for receiving a seal member; and at least one seal retainer disposed between said coupling member and said at least one locking washer for retaining said seal member, said at least one seal retainer having an inner surface which in inclined in a concave direction toward said seal member, and wherein said inner surface of said at least one seal retainer presses said seal member to apply a converging, concentrated, and conical force to said seal member, wherein the axis of said converging, concentrated, and conical force is aligned with the axis of said conduit.

2. The conduit coupling of claim 1, wherein said seal retainer is formed in the form of a conical spring, and placed such that an outer periphery thereof is positioned toward said coupling member, while an internal periphery thereof is positioned on the internal surface of said fastening nut, when no external force is applied on said locking washer.

3. The conduit coupling of claim 1, wherein said coupling member includes at least two entry bores, and said conduit coupling further including a stopper connecting each of said at least two entry bores, wherein said stopper has a diameter less than that of each of said entry bores, each of said entry bores including a tapered portion communicating with said stopper.

4. The conduit coupling of claim 2, wherein said coupling member includes at least two entry bores, and said conduit coupling further including a stopper connecting each of said at least two entry bores, wherein said stopper has a diameter less than that of each of said entry bores, each of said entry bores including a tapered portion communicating with said stopper.

5. A conduit coupling in accordance with any one of claim 2 or 1, wherein said coupling member is a coupling member selected from the group consisting of an I-type, an L-type, and a T-type.

* * * * *